W. E. WYCHE.
Plow.
No. 14,333.
Patented Feb. 26, 1856.
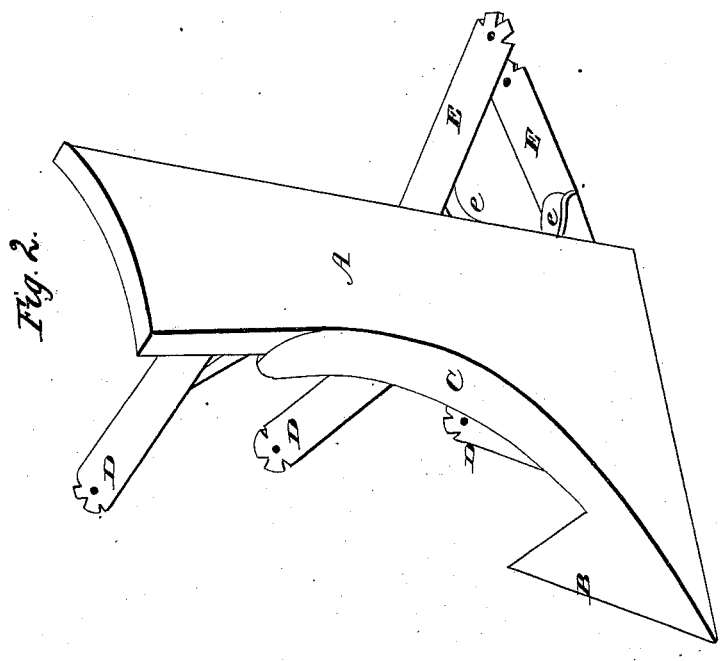
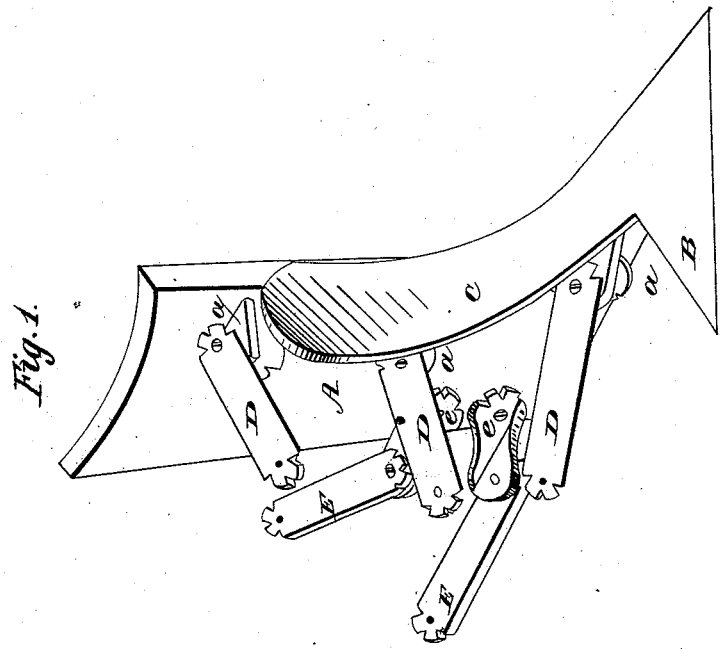

UNITED STATES PATENT OFFICE.

WM. E. WYCHE, OF BROOKVILLE, NORTH CAROLINA.

IMPROVEMENT IN CULTIVATING-PLOWS.

Specification forming part of Letters Patent No. 14,333, dated February 26, 1856.

*To all whom it may concern:*

Be it known that I, WILLIAM E. WYCHE, of Brookville, in the county of Granville and State of North Carolina, have invented certain new and useful Improvements in Cultivating-Plows; and I do hereby declare the following to be a full, clear, and exact description of the same, reference being had to the accompanying drawings, making a part thereof, in which—

Figure 1 represents a perspective view taken from one side of the plow, and Fig. 2 represents a perspective view taken from its opposite side.

Similar letters, where they occur in the two separate figures, denote like parts.

I am aware that cutters have been attached and used both on the mold-board and on the landside of plows. These cutters project beyond or above the landside and mold-board, and the plow is consequently drawn not only against the friction of the mold-board and landside, but against the additional resistance of the cutters, and their utility, when compared with the increase of power to force the plow through the soil, is questionable.

My invention may be said to consist in the use of a mold-board made up of a series of cutting-blades, which divides, cuts, and turns over the furrow-slice, so as to deposit the pulverized soil mostly in the furrow, and turns the sod or turf upon the surface.

To enable others skilled in the art to make and use my invention, I will proceed to describe the same with reference to the drawings.

A represents the standard of a plow, to which is attached a share, B. The front edge of the standard is slightly concave, and upon it is placed a shield, C, to protect the lugs behind it, to which the knives or cutters are attached, from the earth or furrow-slice.

Behind the shield C are arranged lugs *a a a*, which may be permanently or adjustably fixed to the standard, and upon these lugs are placed the knives or cutters D D D, so as to take the place of, and be a substitute for, the ordinary mold-board.

The furrow-slice, being divided by the share and colter from the soil, is slightly turned by the shield C toward the cutters D, which preserve or form the mold-board, and they cut, divide, and turn over the furrow-slice thus brought against them. The pulverized earth will pass between the cutters and drop into the furrow that the plow for the time being is making. Any sods, turf, or clods that are not cut or reduced small enough to pass between the cutters are raised by the cutters as they, one after the other, are brought in contact with them, until finally all such turf, sod, or clods are thrown upon the surface, where the action of the air will more readily reduce them, the pulverized soil being underneath. This, it will be perceived, is reversing the ordinary system of plowing, for the universal practice now is to turn the sod and turf under and bring the light soil on top.

On the rear of the standard may be placed other cutters, E E, fastened to lugs *e e*, and said cutters and lugs (one or both) may have an adjustment horizontally and vertically. These cutters E serve the purpose of the ordinary bar of the common plow, to give it steadiness and direction through the ground. By throwing the cutters E (one or both) into the land side beyond the face of the standard A they become expanding-bars and throw the point of the plow more into the land, and thus cause it to take a broader slice.

The knives or cutters are so made, as seen in the drawings, as that they may be reversed or turned end for end and fastened to the lugs, this being for the purpose of wearing them away with more uniformity.

The cutters arranged behind the shield are in such position as that a plane drawn to meet their edges would have the form of a mold-board. The cutters and lugs being adjustable, the form of such a plane may be varied at pleasure or to suit the special purpose for which the plow is required.

Thus while I dispense with the ordinary mold-board, for which I substitute a series of cutting-blades, yet I have all the advantages of a mold-board by the arrangement of the cutters, and materially reduce the friction of the plow.

Having thus fully described the nature of my invention, I would state that I do not claim one or more cutters on the ordinary mold-board or on the standard of a plow with a mold-board on the opposite side, as these are not new; but

What I do claim as new, and desire to secure by Letters Patent, is—

Substituting a series of knives or cutting-blades on the standard in the place of and for a mold-board, for dividing, cutting, and turning the furrow-slice horizontally, or nearly so, and depositing the pulverized soil mostly in the furrow, and turning the sod or turf upon the surface, and this I claim whether said knives be made adjustable or otherwise, substantially as described.

WILL. E. WYCHE.

Witnesses:
   THOS. H. UPPERMAN,
   E. COHEN.